United States Patent
Purse et al.

(10) Patent No.: US 6,816,680 B2
(45) Date of Patent: Nov. 9, 2004

(54) OPTICAL COMMUNICATIONS NETWORK AND NODES FOR FORMING SUCH A NETWORK

(75) Inventors: Christopher M Purse, Chelmsford (GB); Francesco Ledda, Plano, TX (US)

(73) Assignee: Nortel Networks Limited, St. Laurent (CA)

( * ) Notice: Subject to any disclaimer, the term of this patent is extended or adjusted under 35 U.S.C. 154(b) by 601 days.

(21) Appl. No.: 09/735,034

(22) Filed: Dec. 12, 2000

(65) Prior Publication Data

US 2002/0071148 A1 Jun. 13, 2002

(51) Int. Cl.[7] .............................................. H04J 14/02
(52) U.S. Cl. .............................................. 398/5; 398/1
(58) Field of Search ........................... 398/7, 12, 50, 398/59, 79, 139, 5; 356/28

(56) References Cited

U.S. PATENT DOCUMENTS

| | | | | |
|---|---|---|---|---|
| 5,739,935 A | * | 4/1998 | Sabella | 398/50 |
| 5,828,472 A | * | 10/1998 | Masetti | 398/47 |
| 5,867,289 A | * | 2/1999 | Gerstel et al. | 398/12 |
| 6,115,154 A | * | 9/2000 | Antoniades et al. | 398/4 |
| 6,259,837 B1 | * | 7/2001 | de Boer et al. | 385/24 |
| 6,542,268 B1 | * | 4/2003 | Rotolo et al. | 369/44.23 |
| 6,570,685 B1 | * | 5/2003 | Fujita et al. | 398/79 |
| 6,643,464 B1 | * | 11/2003 | Roorda et al. | 398/59 |

* cited by examiner

*Primary Examiner*—Jason Chan
*Assistant Examiner*—David C. Payne
(74) *Attorney, Agent, or Firm*—Barnes & Thornburg LLP

(57) ABSTRACT

An optical network has a main fiber (14) and a protection fiber (16) between a source node (12a) and a destination node (12b). The source node (12a) is provided with a plurality of transponders (22) and a splitter (20) for providing source node data onto the main and protection paths, with the transponders (22) being positioned on the node side of the splitter (20). The destination node (12b) is provided with a plurality of transponders (34) and a switch (36) for selecting which of the main and protection paths to route to a receiver (38) of the node, the transponders (34) being positioned on the node side of the switch (36). This arrangement reduces the number of transponders required, as they are provided before the splitter at the transmitting node, and after the switch at the receiving node. The destination node (12b) preferably further comprises a monitoring arrangement for monitoring the signal from the protection path (16).

14 Claims, 2 Drawing Sheets

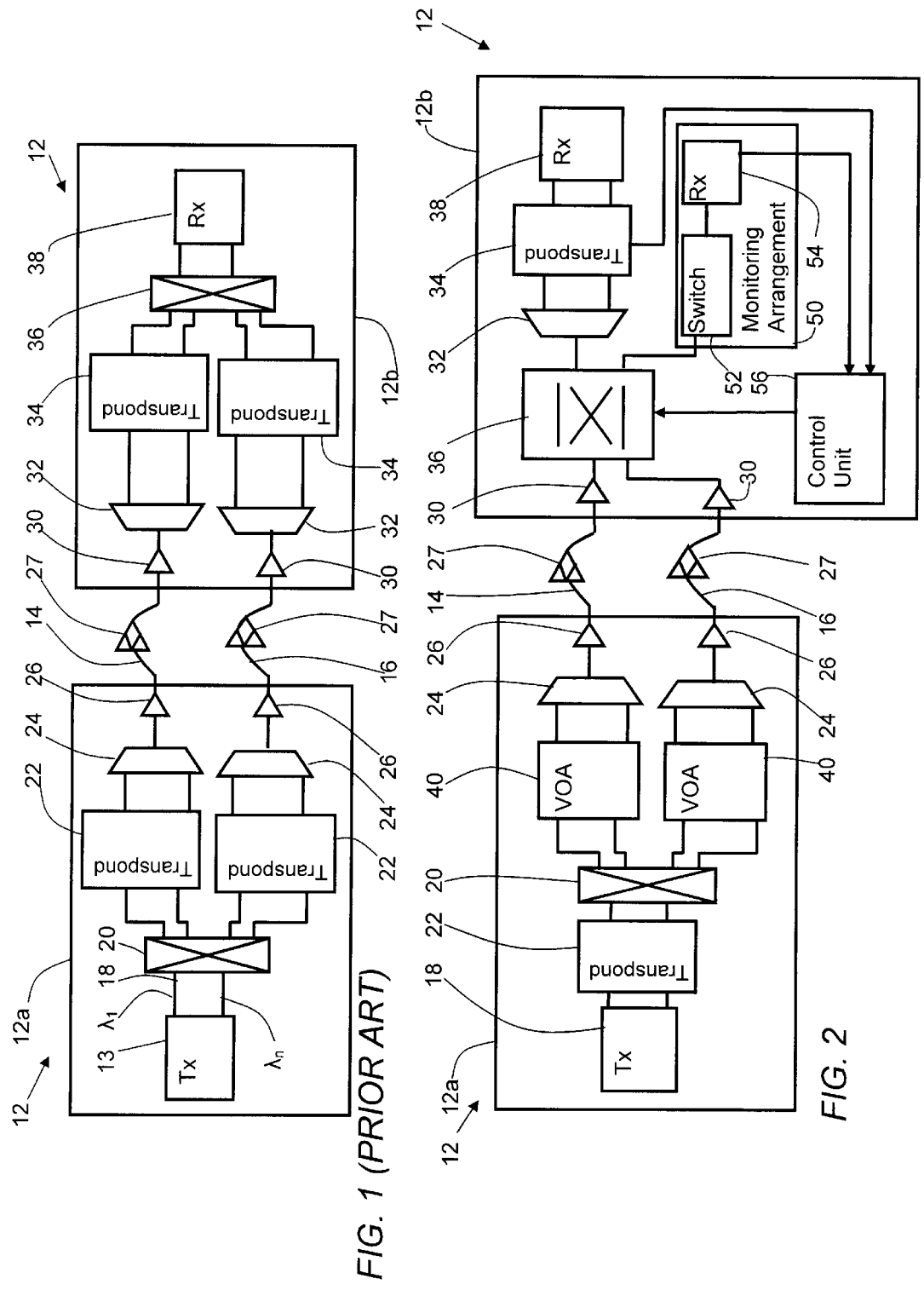

OPTICAL COMMUNICATIONS NETWORK AND NODES FOR FORMING SUCH A NETWORK

FIELD OF THE INVENTION

This invention relates to optical communications networks. The invention is particularly directed to point-to-point connections in which a protection path is provided, to enable communication between a pairs of communicating nodes despite rupture of the main signal carrying fibre between those nodes.

BACKGROUND OF THE INVENTION

One possible way to provide a protection path between nodes is to provide an additional protection cable between the pair of nodes, which preferably follows a different path to the main signal carrying fibre joining the nodes. This ensures that the protection cable is not susceptible to the same failure as the main cable. The source node provides the data to be protected on two ports- a working port and a protection port, and the signals from the two ports are routed using the different paths. These paths may pass through other nodes wit a network, although the connection between the source and destination nodes may be considered as a point-to-point connection.

This type of dedicated protection scheme results in a large amount of additional bandwidth which is normally unused. This approach may therefore be considered to be bandwidth inefficient, although it is extremely simple to implement.

An alternative approach is to provide a protection path of lower bandwidth than the bandwidth of the main traffic between the nodes. This may be achieved by having a first number of main signal carrying fibers between the nodes, and a second lower number of protection fibers. For example, 1; n protection may be implemented, where n is the number of working fibers sharing a protection fiber. This system is slightly more complicated to implement, as the data on the working fiber or fibers must be prioritised so that the protection bandwidth can be allocated to the protection of the most important data in the event of a failure.

The invention is concerned with either type of protection scheme in point-to-point communication links.

In normal operation of the communication link; all traffic will flow along the working fiber or fibers. At the receiving end of the link, the receiving circuitry is used to detect failure and thereby trigger the protection switching operation when necessary.

This protection switching involves operating a switch so that traffic from the protection fiber (instead of the working fiber) is routed to the receiver. It is, however, necessary also to monitor the protection path, as this may also be subject to failures. This can not be achieved with the receiving circuitry as in normal operation it only receives data from the working fiber or fibers.

In WDM systems, signals are modulated on a specific channel wavelength for transmission over the network. The channel wavelength is likely to be different to the frequency on which the signal from the client device is modulated. Therefore, it is known to provide wavelength translators (transponders) at the transmitting node and at the receiving node. These transponders carry out opto-electric and electro-optic conversion with frequency translation in the electrical domain. The transponders can also be used for detecting signal failure.

Therefore, in a known systems the signals from the transmitting node are divided into two branches and then pass through transponders on each branch. These enable different power levels to be injected into the main and protection paths, so that the power received at the receiving node is within required limits of the receiving circuitry. At the receiving node, there are transponders on each branch (the main branch or the protection branch) before the switch routes signals on the selected branch to the receiver. These transponders at the receiving node enable the protection path to be monitored for failures as well as the working path.

A problem with this configuration is the number of wavelength translators required at each node site.

SUMMARY OF THE INVENTION

According to the present invention, there is provided an optical network comprising a source node and a destination node, a first, main, optical fiber path between the nodes and a second protection, optical fiber path between the nodes, wherein each path is for carrying a plurality of WDM channels, wherein the some node is provided with a plurality of transponders and a splitter for providing source node data onto the main and protection paths, the transponders being positioned on the node side of the splitter, and where the destination node is provided with a plurality of transponders and a switch for selecting which of the main and protection paths to route to a receiver of the node, the transponders being positioned on the node side of the switch This arrangement reduces the number of transponders required, as they are provided before the splitter at the transmitting node, and after the switch at the receiving node.

Preferably the destination node fiber comprises a monitoring arrangement for monitoring the signal from the protection path. The separate monitoring arrangement is provided for monitoring the receipt of data from the protection path, as the transponders at the receiving node cannot be used for monitoring the protection path.

The reduction in the number of transponders at the transmitting node removes the possibility of independent gain control for the main and protection paths using the transponders at the transmitting node. This may not cause any problem if the node amplifiers (pre-amplifiers and post-amplifiers) have sufficient gain flattening. However, the source node may comprise an optical attenuator for each channel of the main and protection paths. This enables the signal level at the receiving node on the main and protection paths to be controlled. These optical attenuators are additional components but they can be implemented at much lower cost than the transponders previously used for signal equalisation purposes. For example, the attenuators comprise variable optical attenuators.

The monitoring arrangement may comprise a wavelength switch for providing the signal on each wavelength of the protection path, in turn, to a receive. There is no need to monitor the channels simultaneously, as a slow monitoring arrangement is sufficient. A tuneable filter arrangement may instead be used to route protection channels selectively to a detector arrangement.

The switch may comprise a 2×2 photonic switch, with the main and protection paths as inputs, and the node receiver and the monitoring arrangement as outputs. The transponders in the destination node are used for failure detection of data on the main path, with failure detection being signalled to a control unit which controls the operation of the switch.

The main fiber path may have greater bandwidth than the protection fiber path, so that protection is shared For example, the main fiber path comprises a first number of fibers and the protection fiber path comprises a lower second number of fibers. This enables 1:n or n:m protection to be implemented.

According to a second aspect of the invention, there is provided, in an optical communications network comprising a source node and a destination node, a first, main, optical fiber path between the nodes and a second, protection, optical fiber path between the nodes, with each path carrying a plurality of WDM channels, a method of sending protected data from the source node to the destination node, comprising at the source node, passing the data from the source node to be allocated to a channel through a transponder for providing the data onto a WDM channel frequency;

splitting the data on the WDM channel frequency into main and protection components;

routing the main and protection components using diverse paths to the destination node;

at the destination node, using a switch to select which of the main and protection path signals are routed to the receiver of the destination node, monitoring signal failure or degradation on the channels of the incoming main path to the destination node using transponders in the receiver, and monitoring the signal received from the protection path using a monitoring arrangement.

This method enables a data channel to be split into main and protection pats after the wavelength translation operation. At the receiving node, wavelength translation is carried out after the switching operation, so that the transponders can only be used for monitoring signal failure on one of the main or protection paths. Thus, a separate monitoring arrangement is provided.

The main and protection components may be passed through variable attenuators, for equalising the signal intensity received along the and protection paths at the destination node.

The invention also provides a source node and a destination node for use in the network architecture of the invention.

BRIEF DESCRIPTION OF THE DRAWINGS

The invention will now be described by way of example with reference to the accompanying drawings, in which:

FIG. 1 shows a known point-to-point network architecture with dedicated protection;

FIG. 2 shows a point-to-point network architecture with dedicated protection according to the invention.

DETAILED DESCRIPTION OF THE INVENTION

Figure 3:
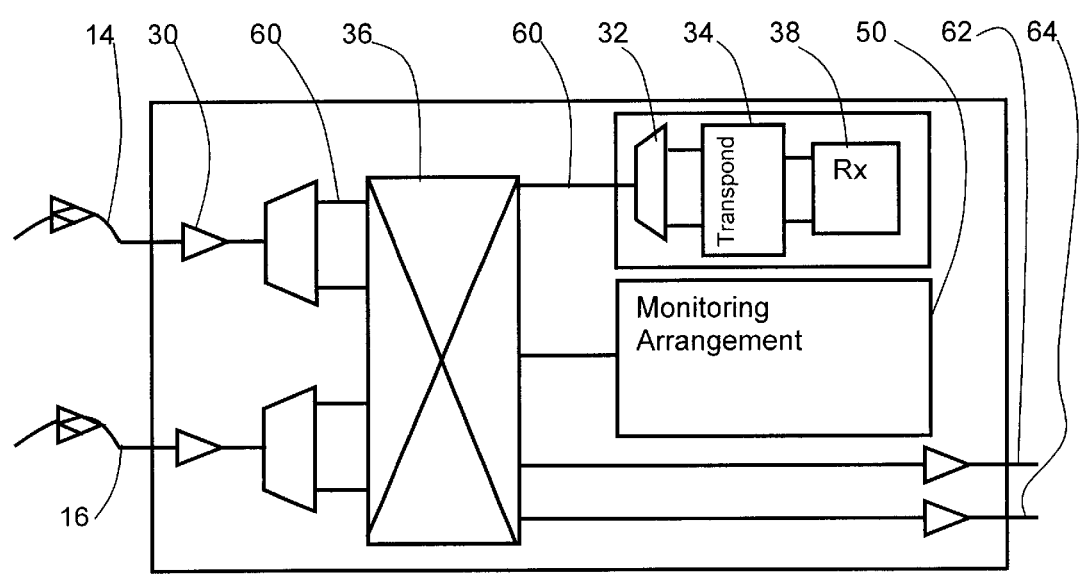
FIG. 3 shows a modification providing add/drop capability.

FIG. 1 shows a network using a conventional architecture to achieve dedicated protection for point-to-point traffic. The adjacent nodes 12 are connected by a working optical fiber 14 and by a protection optical fiber 16. Each fiber is for carrying a plurality of WDM channels. At the source node 12a, the individual channels are provided by a transmitter 13 on respective lines 18 before being divided into the main path 14 and the protection path 16 by a splitter 20. This splitter may be an optical component or an electrical component.

Each path 14, 16 is provided with a bank of transponders 22, which enable different power levels to be injected into the main and protection paths, so that the power received at the receiving node is within required limits of the receiving circuitry, The transponders also provide the WDM channels on the required frequency carriers of the ITU grid. After the required frequency translation and power control, the channels are multiplexed together by multiplexers 24. The combined signals are than amplified by a post-amplifier 26 before launch onto the paths 14, 16.

The paths are typically provided with in line amplifiers 27.

At the receiving node 12b, the main and protection paths are passed through a preamplifier 30 before the WDM signal is demultiplexed by units 32 to form the individual channels. A bank of transponders 34 is provided for the main branch and the protection branch. These transponders enable failure detection to be carried out for each channel and for the main and the protection paths.

The failure detection dictates the configuration of a switching arrangement 36 which controls whether signals from the main path or from the protection path are provided to the receiver 38 of the destination node 12b. The transmitter 13 and the receiver 38 comprise the client equipment. The switching is possible on a wavelength, band of wavelengths or fiber level. For example, if protection switching is or a fiber level, a fault detected on any channel will cause the protection path to be used for all channels.

FIG. 2 shows a network architecture according to the invention. For the purposes of explanation FIG. 2 also simply shows point-to-point communication between two nodes 12a, 12b. However, as will be apparent from the following description, the invention may be applied more generally to networks with the nodes having add/drop capability and in more complex network architectures.

Where the same components are used as in the prior art of FIG. 1, the same reference numerals are used.

At the source node 12a, the individual channels 18 are passed through the transponder bank 22 before being divided into the main path 14 and the protection path 16 by the splitter 20. The bank of transponders 22 therefore no longer enables different power levels to be injected into the main and protection paths, but the transponders do still function to provide the WDM channels on the required frequency carriers of the ITU grid. The transponders also put on line conditioning signals used by the amplifiers.

To provide the differential power control of the signals on the main and protection paths, variable optical attenuators 40 are provided in each path for each channel. After the required power control by the attenuators 40, the channels are multiplexed together by the multiplexers 24. The combined signals are again are by the post-amplifier 26 before launch onto the paths 14, 16.

At the receiving node 12b, the main and protection paths are passed through a preamplifier 30 before the selected path is switched to the receiver 38 by the switching arrangement 36.

The output path from the switch arrangement 36 to be provided to the receiver 38 includes the demultiplexing unit 32 for forming the individual channels. A bank of transponders 34 is provided only in this path. These transponders therefore only enable failure detection to be carried out for the branch currently switched to the receiver 38. These transponders consequently can not detect failures on the protection path channels, and these failures are therefore silent. To provide failure detection for the protection path the destination node further comprises a monitoring arrangement 50 for monitoring the receipt of data from the protection path. The monitoring arrangement 50 is shared across all wavelengths whereas the bank of transponders 34 comprises transponders for each wavelength.

In the example of FIG. 2, the switching arrangement 36 comprises a 2×2 switch. In normal operation, the main path 14 is routed to the path leading to the receiver 38, whereas the protection path is routed to the monitoring arrangement 50. This represents the required configuration for the vast majority of the time and protection switching is required extremely infrequently. Therefore, the monitoring of the protection path can be carried out using a relatively slow process. The switch 36 may comprise part of a larger switch which additionally carries out other functions.

The monitoring arrangement of FIG. 2 may comprise a wavelength selective switch 52 for providing the signal on each wavelength of the protection path, in turn, to a receiver 54. Alternatively, the monitoring arrangement may comprise a tuneable filter may be used for providing the signal on each wavelength of the protection path, in turn, to the receiver 54.

The signals from the transponder bank 34 and from the receiver 54 are supplied to a control unit 56, which controls the switching arrangement 36.

The invention reduces the number of transponders required. In the example described above, variable optical attenuators are provided to enable suitable power to be launched into the main and protection paths. However, these are not essential, and may be avoided (in future) if suitable gain control schemes can be implemented, for example at the amplifier sites.

As described above, the switching may be on a fiber level- so that a fault detected on any channel causes the protection path to be used for all channels. However, it is also possible for the protection switching to be carried out the basis of bands of wavelengths rather than the entire fiber signal, or even on individual wavelengths.

Although dedicated protection switching is described above, it is equally possible for the invention to applied to a connection which provides shared (1:n) protection. In this case, only a proportion of the main path channels are provided to the protection path, so that in the event of a protection switch protection is only available for a proportion of the bandwidth of the main path. Alternatively, the channels may be prioritised, and protection switching can be carried out at the level of a bundle of channels.

FIG. 3 shows a modification providing add/drop capability at the nodes. The switching arrangement 36 is for switching bands 60 of channels which are provided by band demultiplexers 62 for the main and protection paths. The control of the switching arrangement 36 enables some channel bands to be dropped to the receiver 38 of the node (and the corresponding protection channels being dropped to the monitoring arrangement 50). However, other bands of main channels 62 and protection channels 64 can be passed though to the at section of the network. In this case, the node acts as an add drop site but also as a routing node. In this way, the invention can be implemented not only in point-to-point communications systems, but also in other networks architectures.

In the above description, signal failure, e.g. loss of light, is described as causing the protection switching. However, protection switching may also be initiated based on a predetermined level of signal degradation. This degradation may be determined by electrical analysis monitoring overhead parity bits, but can equally be determined by optical analysis.

For simplicity, the invention has been described in connection with a mono-directional link. However, the invention can equally be applied to bi-directional links.

We claim:

1. An optical network comprising a source node and a destination node, a first, main, optical fiber path between the nodes and a second, protection, optical fiber path between the nodes, wherein each path is for carrying a plurality of WDM channels, wherein the source node is provided with a plurality of transponders and a splitter for providing source node data onto the main and protection paths, the transponders being positioned on the node side of the splitter, such that each transponder is shared between a main and protection path, and wherein the destination node is provided with a plurality of transponders and a switch for selecting which of the main and protection paths to route to a receiver of the node, the transponders being positioned on the node side of the switch such that each transponder is shared between a main and protection path, and wherein the destination node further comprises a monitoring arrangement for monitoring the signal from the protection path.

2. A network according to claim 1, wherein the source node comprises an optical attenuator for each channel of the main and protection paths.

3. A network according to claim 2, wherein the attenuator comprises a variable optical attenuator.

4. A network according to claim 1, wherein the monitoring arrangement comprises a wavelength switch for providing the signal on each wavelength of the protection path, in turn, to a receiver.

5. A network according to claim 1, wherein the monitoring arrangement comprises a tuneable filter for providing the signal on each wavelength of the protection path, in turn, to a receiver.

6. A network according to claim 1, wherein the switch comprises a 2×2 switch, with the main and protection paths as inputs, and the node receiver and the monitoring arrangement as outputs.

7. A network according to claim 1, wherein the transponders in the destination node are used for failure detection of data on the main path, and wherein failure detection is signalled to a control unit which controls the operation of the switch.

8. A network according to claim 1, wherein the main fiber path has greater bandwidth than the protection fiber path.

9. A network according to claim 8, wherein the main fiber path comprises a first number of fibers and the protection fiber path comprises a lower second number of fibers.

10. In an optical communications network comprising a source node and a destination node, a first, main, optical fiber path between the nodes and a second, protection, optical fiber path between the nodes, with each path carrying a plurality of WDM channels, a method of sending protected data from the source node to the destination node, comprising:

at the source node, passing the data from the source node to be allocated to a channel through a transponder for providing the data onto a WDM channel frequency for subsequent transmission over main and protection paths;

splitting the data from the transponder on the WDM channel frequency into main and protection components;

routing the main and protection components using diverse paths to the destination node;

at the destination node, using a switch to select the main path or the protection path and routing the selected path to a transponder, which transponder is thereby shared between the main and protection paths for the channel frequency; and monitoring signal failure or degradation on the channels of the incoming main path to the destination nods using said transponders, and monitoring the signal received from the protection path using a monitoring arrangement.

11. A method according to claim 10, wherein the main and protection components are passed through variable attenuators, for equallising the signal intensity received along the main and protection paths at the destination node.

12. A method according to claim 10, wherein signal on the protection path is monitored by switching the signal one each channel of the protection path, in turn, to a receiver.

13. A method according to claim 10, wherein signal on the protection path is monitored by tuning a tuneable filter for providing the signal on each wavelength of the protection path, in turn, to a receiver.

14. A node for an optical network, the network comprising a first, man, optical fiber path and a second, protection, optical fiber path, wherein each path is for carrying a plurality of WDM channels, wherein the node is provided with;

a receiver and a transmitter;

a plurality of transponders;

a switch for selecting which of main and protection inputs to route to the receiver of the node, the transponders being positioned on the node side of the switch such that each transponder is shared between the main and protection inputs for a respective channel; and a splitter for providing data output from the transmitter onto the main and protection paths, the transponders being provided on the node side of the splitter;

and wherein the node further comprises a monitoring arrangement for monitoring the signal received from the protection input.

* * * * *